(12) United States Patent
Bulan et al.

(10) Patent No.: US 10,640,399 B2
(45) Date of Patent: May 5, 2020

(54) OSMOTIC DISTILLATION PROCESS FOR CONCENTRATING A LIQUID CONTAINING SODIUM CHLORIDE

(71) Applicant: Covestro Deutschland AG, Leverkusen (DE)

(72) Inventors: Andreas Bulan, Langenfeld (DE); Yuliya Schießer, Siegburg (DE); Rainer Weber, Odenthal (DE)

(73) Assignee: Covestro Deutschland AG, Leverkusen (DE)

( * ) Notice: Subject to any disclaimer, the term of this patent is extended or adjusted under 35 U.S.C. 154(b) by 126 days.

(21) Appl. No.: 15/740,174

(22) PCT Filed: Jun. 29, 2016

(86) PCT No.: PCT/EP2016/065195
§ 371 (c)(1),
(2) Date: Dec. 27, 2017

(87) PCT Pub. No.: WO2017/001513
PCT Pub. Date: Jan. 5, 2017

(65) Prior Publication Data
US 2018/0186665 A1 Jul. 5, 2018

(30) Foreign Application Priority Data
Jul. 1, 2015 (EP) .................................... 15174857

(51) Int. Cl.
*B01D 61/36* (2006.01)
*B01D 71/26* (2006.01)
(Continued)

(52) U.S. Cl.
CPC ............ *C02F 1/447* (2013.01); *B01D 61/364* (2013.01); *B01D 71/26* (2013.01); *B01D 71/36* (2013.01);
(Continued)

(58) Field of Classification Search
CPC .. C02F 1/447; C02F 2103/38; C02F 2101/12; C02F 1/048; B01D 71/26; B01D 71/36;
(Continued)

(56) References Cited

U.S. PATENT DOCUMENTS 3,655,333 A 4/1972 Stenger et al.
4,267,026 A 5/1981 Patel
(Continued)

FOREIGN PATENT DOCUMENTS

DE 60025256 T2 8/2006
DE 102008012037 A1 9/2009
(Continued)

OTHER PUBLICATIONS

International Search Report for PCT/EP2016/065195 dated Sep. 9, 2016.
(Continued)

*Primary Examiner* — Joseph W Drodge
(74) *Attorney, Agent, or Firm* — Faegre Drinker LLP

(57) ABSTRACT

Described is an osmotic distillation process for concentrating a liquid containing sodium chloride, and in particular a treatment process for used reaction water containing sodium chloride from the production of polymers.

14 Claims, 2 Drawing Sheets

Figure 1:
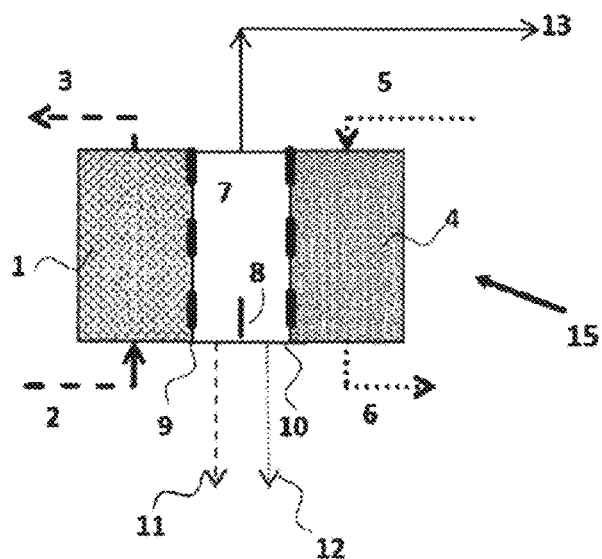

(51) Int. Cl.
*B01D 71/36* (2006.01)
*C25B 1/46* (2006.01)
*C25B 15/08* (2006.01)
*C02F 1/44* (2006.01)
*C02F 101/12* (2006.01)
*C02F 103/38* (2006.01)

(52) U.S. Cl.
CPC .............. *C25B 1/46* (2013.01); *C25B 15/08* (2013.01); *B01D 2311/04* (2013.01); *B01D 2313/32* (2013.01); *C02F 2101/12* (2013.01); *C02F 2103/38* (2013.01)

(58) Field of Classification Search
CPC .............. B01D 61/364; B01D 2313/32; B01D 2311/04; B01D 3/12; B01D 61/36; B01D 61/366; B01D 2323/32; C07C 7/04; C07C 7/05; C07C 7/08; C07C 7/144; C25B 1/34; C25B 1/46; C25B 15/08
USPC .... 203/10, 12; 210/640, 641, 649, 650, 652; 585/800, 818
See application file for complete search history.

(56) References Cited

U.S. PATENT DOCUMENTS

| | | | | |
|---|---|---|---|---|
| 4,545,862 A * | 10/1985 | Gore | ............... | B01D 61/364 203/10 |
| 4,592,768 A | 6/1986 | Cutler et al. | | |
| 4,781,837 A | 11/1988 | Lefebvre | | |
| 4,944,882 A * | 7/1990 | Ray | ............... | B01D 61/58 210/640 |
| 5,824,223 A * | 10/1998 | Michaels | ............. | B01D 61/002 210/642 |
| 6,299,777 B1 | 10/2001 | Bowser | | |
| 8,106,144 B2 | 1/2012 | Ooms et al. | | |
| 8,318,971 B2 | 11/2012 | Pohl et al. | | |
| 8,882,984 B2 | 11/2014 | Ooms et al. | | |
| 2006/0144788 A1* | 7/2006 | Cath | ............... | B01D 61/364 210/640 |
| 2009/0297431 A1* | 12/2009 | McGinnis | ............... | B01D 3/146 423/580.1 |
| 2011/0203994 A1* | 8/2011 | McGinnis | ............ | B01D 61/002 210/650 |
| 2012/0067819 A1* | 3/2012 | McGinnis | ............... | B01D 3/145 210/640 |
| 2012/0267307 A1* | 10/2012 | McGinnis | ............ | B01D 61/002 210/638 |
| 2013/0048564 A1* | 2/2013 | Stewart | ............... | C07F 9/65815 210/644 |
| 2013/0233797 A1* | 9/2013 | Cath | ............... | B01D 61/002 210/642 |
| 2014/0319056 A1* | 10/2014 | Fuchigami | ........... | B01D 63/043 210/648 |
| 2014/0319066 A1* | 10/2014 | Locascio | ................. | C12F 3/10 210/710 |
| 2017/0210656 A1* | 7/2017 | Hancock | ................. | C02F 9/00 |

FOREIGN PATENT DOCUMENTS

| | | |
|---|---|---|
| DE | 102009023940 A1 | 12/2010 |
| EP | 2241550 A1 | 10/2010 |
| EP | 2286898 A1 | 2/2011 |
| WO | WO-9717128 A1 | 5/1997 |
| WO | WO-2001012304 A1 | 2/2001 |
| WO | WO-2005118114 A1 | 12/2005 |
| WO | WO-2013074040 A1 | 5/2013 |

OTHER PUBLICATIONS

Written Opinion of the International Searching Authority for PCT/EP2016/065195 dated Sep. 9, 2016.

* cited by examiner

OSMOTIC DISTILLATION PROCESS FOR CONCENTRATING A LIQUID CONTAINING SODIUM CHLORIDE

CROSS-REFERENCE TO RELATED APPLICATIONS

This application is a national stage application (under 35 U.S.C. § 371) of PCT/EP2016/065195, filed Jun. 29, 2016, which claims benefit of European application No. 15174857.1, filed Jul. 1, 2015, both of which are incorporated herein by reference in their entirety.

The invention relates to an osmotic distillation process for concentrating a liquid containing sodium chloride. The invention relates in particular to a work-up process for reaction wastewater which is obtained from the production of polymers and contains sodium chloride.

The invention proceeds from osmotic distillation processes which are known per se and usually provide for the transfer of water from, for example, a liquid containing sodium chloride through a membrane into a draw solution.

In classical osmotic distillation (OD) according to the direct contact principle, a liquid mixture (feed) comprising a volatile component is separated by a microporous membrane, which cannot be wetted by the liquid, from a second liquid phase (draw solution) which can absorb the volatile component. The key part of the known OD is the hydrophobic membrane. Aqueous solutions cannot wet the membrane but can release water vapor at the membrane surface (feed side), which permeates through the pores of the membrane and condenses on the draw solution side of the membrane. The driving force for the OD is the vapor pressure difference between the respective vapor pressure over the feed solution and over the draw solution. The membrane in this case serves as barrier for phase separation.

OD per se requires no additional heat or use of a pressure difference as driving force and is thus generally suitable for concentrating aqueous solutions and in particular sensitive products from the food, chemical and pharmaceutical industry.

The modules researched and/or used up to now for OD all utilize exclusively the principle of direct contact of the two fluids (feed solution and draw solution) with a membrane.

Approaches for utilizing NaCl-containing process wastewaters for electrolysis are known in principle. However, the NaCl concentration required for chlorine electrolysis is achieved by dissolving fresh salt in the purified process wastewater. In this way, only part of the total wastewater can be recycled because of the water balance of the electrolysis.

In order to be able to recycle the total wastewater, concentrating the solution is necessary. This can be effected, for example, by thermal evaporation (WO/2001/38419). Furthermore, the following methods of increasing the NaCl concentration are known: 1) microwave energy (U.S. Pat. No. 4,267,026); 2) combination of freezing, centrifugation and reverse osmosis (U.S. Pat. No. 4,592,768); 3) crystallization of the hydrates (U.S. Pat. No. 3,655,333). However, all these processes are energy-intensive and costly.

The use of NaOH as draw solution is known in principle from the prior art (see WO/2005/18114). However, this relates to the use of OD for concentrating NaCl brine in the anolyte circuit. There, MicroZa® and Gore-Tex® tubular microfiltration modules are employed as contactors according to the direct contact principle. However, a serious problem of the known OD process according to the direct contact principle is contamination of the draw solution with NaCl.

A further hindrance to the use of process water containing sodium chloride for known OD processes is contamination of the solution with organic impurities. It is conceivable to remove the organic impurities by means of, for example, activated carbon.

However, a part of the impurities still remains in a concentration in the ppm range in the wastewater. These impurities lead to the formation and growth of hydrophilic "hot spots" on the hydrophobic membrane during operation, and these result there in wetting of the membrane and thus breakthrough of the solutions through the membrane. This phenomenon ultimately leads to the undesirable effect of contamination of the NaOH solution.

The disadvantages of the osmotic distillation known from the prior art according to the direct contact principle are in summary:

Formation and growth of hydrophilic places on the hydrophobic membrane during operation because of the wetting substances present in the feed solution or crystallization of the salts, which leads to breakthrough of the solutions through the membrane.

Mutual contamination of the fluid streams when the membrane is wetted or suffers from leaks.

It is an object of the present invention to provide an osmotic distillation process for concentrating a liquid containing sodium chloride, which overcomes the above-described disadvantages of the osmotic distillation processes known from the prior art and, in particular, allows operationally reliable concentration of aqueous solutions containing sodium chloride and/or dilution of the draw solution.

The invention provides an osmotic distillation process for concentrating an aqueous liquid containing sodium chloride, where the liquid has a concentration of up to 20% by weight of sodium chloride, preferably from 2 to 18% by weight of sodium chloride, which comprises at least the following steps, a) optionally prepurification of the liquid to remove organic secondary constituents (in particular phenol, bisphenol A, isopropylphenol, butylphenol, chlorobenzene, dichloromethane, ethylpiperidine and others), in particular down to a total content of the organic secondary constituents of 20 ppm, particularly preferably in respect of the content of ethylpiperidine down to a content of ethylpiperidine of not more than 5 ppm, b) introduction of the purified liquid into a first zone (evaporation zone) which is separated from a diffusion zone adjoining this first zone by a hydrophobic first membrane which is permeable to water vapor, c) diffusion of water vapor from the liquid containing sodium chloride through the membrane into the diffusion zone, d) further diffusion of water vapor from the diffusion zone through a second hydrophobic membrane which is permeable to water vapor into a stripping zone adjoining the diffusion zone and absorption of the water vapor in a draw solution which is continuously replaced in the stripping zone.

As draw solution, it is possible to use any solutions having a high osmotic pressure, in particular aqueous solutions of alkaline metal hydroxides, in particular of NaOH, or of NaCl, $CaCl_2$, $MgCl_2$, polyglycols, etc. An aqueous solution of NaOH has been found to be a particularly preferred draw solution.

A preferred variant of the novel process is thus characterized in that a concentrated alkaline metal hydroxide solution, in particular concentrated sodium hydroxide solution, is used as draw solution.

Particular preference is given to using a draw solution having a concentration of alkaline metal hydroxide, particularly preferably of NaOH, from 10% by weight to 50% by weight, very particularly preferably from 15% by weight to 35% by weight, in particular from 20% by weight to 33% by weight.

An advantage of using sodium hydroxide is that any mixture of sodium hydroxide and sodium chloride obtained may be able to be recycled in a simple manner to form sodium chloride which can be reused.

In a preferred variant of the novel process, a diffusion zone which has drainage for discharging liquid is used and condensate, in particular condensate laden with interfering anions, particularly preferably with interfering chloride anions, or of any liquid passing through the membrane into the diffusion zone or draw solution passing through is discharged. The condensate can be drained off in order, for example, to avoid contamination of the draw solution (e.g. in the case of sodium hydroxide) with chloride anions. In the case of contamination with a content of more than 100 ppm of chloride ions in the sodium hydroxide, increased corrosion of the apparatus parts coming into contact with the product can occur.

In the novel process, a production wastewater from a process for preparing polymers, in particular for preparing polycarbonates or polyurethane intermediates, is preferably used as aqueous liquid containing sodium chloride.

Process solutions which are known from the prior art and can specifically be used for application of the novel process are mentioned by way of example below:

reaction wastewater solution which contains sodium chloride and is obtained in the preparation of polycarbonate, as described, by way of example, in EP2286898 A1;

reaction wastewater solution which contains sodium chloride and is obtained in the preparation of diaryl carbonate, as described, by way of example, in EP2241550A1;

solution which contains alkaline metal chloride and is obtained in the synthesis of diamines and polyamines of the diphenylmethane series for preparing methylendi(phenyl diisocyanate)s, as described, by way of example, in DE102008012037A1.

In a preferred embodiment of the novel process, materials based on a hydrophobic polymer, in particular materials based on polypropylene and/or on polytetrafluoroethylene (PTFE), are used independently as material for the first membrane and the second membrane. Particular preference is given to using membranes composed of PTFE.

At present, only porous membranes are used in the osmotic distillation known from the prior art. The most frequently used membranes are flat membranes, hollow fiber membranes and capillary membranes. The pore size required for OD membranes is usually from about 10 nm to 1 μm. An optimal pore size has to be determined for each individual application as a function of the type of feed solution and has to meet the following requirements: 1) The membrane pores have to be large enough to make the required flux possible. 2) The membrane pores have to be small enough to prevent intrusion of liquid under the envisaged operating conditions.

The range of the maximum pore size which avoids wetting of the membrane pores by the feed solution is from 0.1 to 0.6 μm. However, in the case of membranes employed for OD, the pore size distribution is the more informative parameter since the pore size is not uniform.

For this reason, a membrane having a very narrow pore size distribution of the OD membrane is preferably used for the novel process.

As in the case of other membrane processes, too, the membrane thickness is inversely proportional to the mass transfer and also heat transfer because it represents a resistance which increases with the thickness of the membrane for both transfer processes.

The use of other membrane materials which are known from the prior art is also suitable in principle for carrying out the novel process.

In past years, ceramic, carbon nanotube-containing and metallic membranes, for example, have been examined. At the beginnings of OD, Nylon fibers and silicone-coated glass fibers were also tested as OD membranes.

The use of thin, nonporous (dense) hydrophobic composite membranes for OD is described, for example, in DE60025256T2. The polymer materials described are polytrimethylsilylpropyne (PTMSP) and perfluoro-2,2-dimethyl-1,3-dioxole (Teflon AF).

Owing to the contact with, in particular, alkali metal hydroxide, the inert materials polytetrafluoroethylene (PTFE) and polypropylene (PP) are therefore particularly suitable as membrane material.

The membranes which have been examined most frequently for the known OD processes are flat membranes which are used as plate module (plate and frame module). This construction type is also preferably used for carrying out the novel process. Owing to the particularly simple handling, the versatility due to the exchangeability of the membranes (e.g. in the case of defects), the simple construction, installation and maintenance, this modular construction offers significant advantages. The use of the plate modules also offers advantages in respect of the handling of highly viscous liquids. Furthermore, thinner membranes are installed in the plate modules than in capillary modules, which has a favorable effect on mass transfer.

PP polymer frames are preferred for implementation of the novel OD process. These frames contain openings of various sizes which, in particular, become flow channels for various fluids after a frictional welding process. The channels allow, depending on the frame configuration, access to the interior volume of a frame or to the volume between two frames. If a film or a membrane is additionally sealed onto a frame, flow channels having large areas for heat transfer and mass transfer can be created. If the main handling zones are placed under subatmospheric pressure, the blocks are pressed together and firmly joined by the pressure of the atmosphere. If openings are provided in the plates which close off the individual blocks, the flow channels of two blocks can be connected to one another internally and without further piping being required. The use of friction-welded modules without use of adhesives and sealing materials offers advantages when using sodium hydroxide solution as draw solution.

In the case of the further spiral wound module known in principle from the prior art, a flat membrane is likewise used. However, because of the increased fouling tendency, this module geometry is employed relatively rarely for OD and is therefore less preferably to be used in the novel process.

In the category of tubular membrane modules, there are both tubular and hollow fiber modules and also capillary modules for conventional OD (see, for example: U.S. Pat. No. 4,781,837 A, WO9717128 A1, WO 2001012304 A1, WO2005118114 A1). The highest packing density is offered by hollow fiber modules at 3000 m²/m³. However, due to small membrane diameters of from 50 to 500 μm, they become dirty more readily and have a greater tendency to undergo fouling. Advantages such as a high pressure stability, inexpensive production and a small space requirement nevertheless give them a high commercial potential and make them the most frequently used OD membrane modules after the plate modules. They likewise come into question for the use of the novel process.

The novel OD process is usually carried out under ambient pressure. However, in a preferred embodiment, the pressure in the various zones (evaporation zone, diffusion zone, stripping zone) is, in each case independently, less than ambient pressure, particularly preferably from 10 to 600 mbar.

The process is normally carried out at room temperature in the various zones (evaporation zone, diffusion zone, stripping zone). Preference is given to an embodiment in which the various zones (evaporation zone, diffusion zone, stripping zone) are maintained independently at a temperature of from 10 to 80° C., particularly preferably from 20 to 60° C.

However, a particularly preferred process is characterized in that the temperature in the evaporation zone is greater than in the zones adjoining the evaporation zone, namely the diffusion zone and the stripping zone. This variant has the advantage that a higher vapor pressure difference leads to a greater evaporation rate.

An advantageous variant of the novel process comprises the liquid containing sodium chloride in the evaporation zone and the draw solution in the stripping zone being conveyed in countercurrent past the respective membranes. This variant has the advantage of a constant vapor pressure difference between donor solution and uptake solution.

The effectiveness of the novel process can, in a preferred embodiment, be increased further when the aqueous liquid containing sodium chloride has turbulent flow in the region of the evaporation zone.

As described above, a production wastewater containing sodium chloride from polymer production is, for example, used as aqueous liquid containing sodium chloride.

A particular embodiment of the novel process is accordingly characterized in that alkaline metal hydroxide solution which is taken from a coupled electrolysis process for electrolysis of alkaline metal chloride and, after uptake of water vapor in the stripping zone is fed into a coupled chemical production process, in particular for preparing polymers, is used as draw solution.

Another embodiment of the novel process which is characterized in that the aqueous liquid containing sodium chloride is taken from a coupled chemical production process, in particular a process for preparing polymers, and, after being concentrated in the evaporation zone, is fed into a coupled electrolysis process for the electrolysis of alkaline metal chloride is also advantageous. Here, it can, in particular, be necessary for the organic secondary constituents whose concentrations have likewise been increased during the course of the concentration step to be separated off from the salt solution by means of separation processes which are known in principle before the salt solution is fed to the electrolysis.

In a very particularly preferred embodiment, the two abovementioned different coupling variants are combined with one another.

In a preferred variant of the novel process, the process steps b), c) and d) are carried out in a plurality of stages, with the draw solution and the aqueous liquid containing sodium chloride preferably been conveyed in countercurrent. Here at least one further combination of evaporation zone, diffusion zone and stripping zone is employed. Thus, for example, the concentrated aqueous liquid containing sodium chloride exiting from the first evaporation zone is concentrated further in a second evaporation zone. The more dilute draw solution obtained in a second stripping zone of the second stage is diluted further by absorbed condensates in countercurrent in the first stripping zone of the first stage.

A further important aspect for carrying out the novel OD process and a factor controlling the process is heat transfer. In conventional OD, the driving potential for the required vapor pressure drop is generated by an osmotic difference between the solutions at the same temperature. The latent heat of the water vapor leads to cooling of the feed solution (e.g. NaCl) on vaporization and to heating of the draw solution (e.g. NaOH) on condensation. In addition, dilution of the NaOH with water likewise contributes to an increase in the temperature because of the enthalpy of solution liberated. This heat transfer reduces the driving vapor pressure difference for mass transfer.

A further object of the invention is therefore to discover a particular variant of the novel process which can solve the particular problem of heat transfer.

An energy-saving preferred variant of the abovementioned embodiments of the novel process having two or more coupled arrangements made up of evaporation zone, diffusion zone and stripping zone is therefore characterized in that the concentrated aqueous liquid containing sodium chloride exiting from the evaporation zone of the first osmotic distillation arrangement is subjected to heat exchange in order to set the operating temperature before introduction into a subsequent further osmotic distillation arrangement.

In a preferred variant, the draw solution exiting from the stripping zone of the first osmotic distillation arrangement can, independently of the abovementioned embodiment, be subjected to heat exchange in order to set the operating temperature before introduction into a subsequent further osmotic distillation arrangement.

The invention is illustrated below, with the aid of the figures, by the examples which do not, however, constitute a restriction of the invention.

Figure 2:
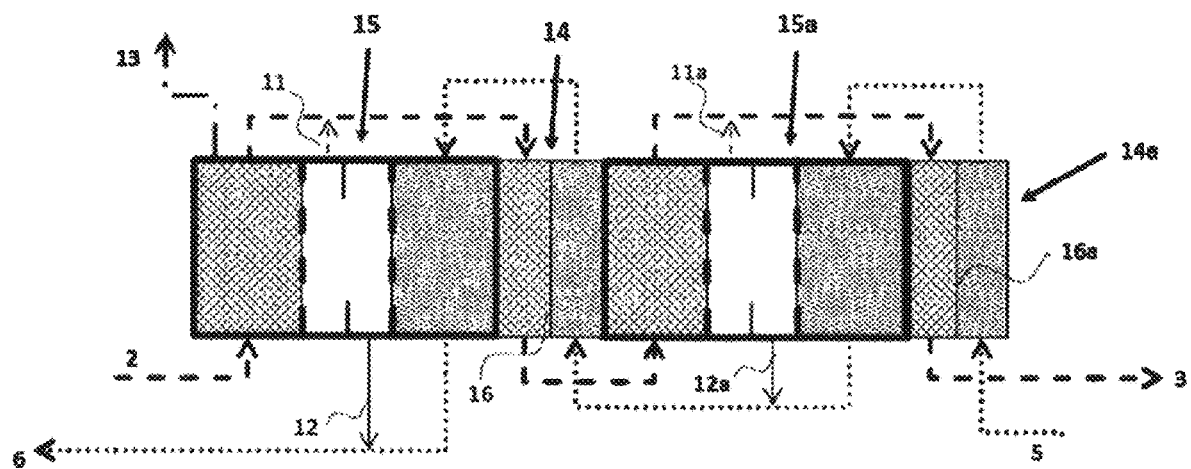

The figures show:

FIG. 1 a cross section through an OVD (osmotic vacuum distillation) arrangement according to the invention FIG. 2 a plan view of a possible connection of a plurality of OVD modules with heat exchangers arranged in between (example of feed solution and draw solution having the same temperature)

Figure 3:
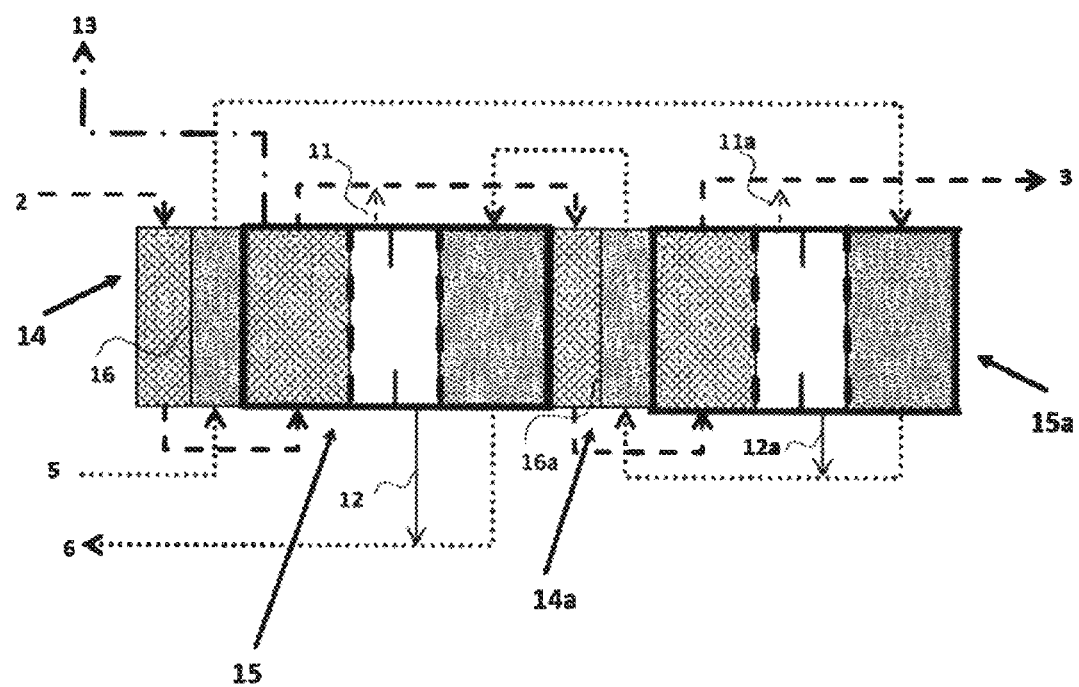

FIG. 3 a plan view of a possible connection of a plurality of OVD modules with heat exchangers arranged in between (example of cold feed solution and hot draw solution)

In the figures, the reference numerals have the following meanings:

1 draw solution chamber (stripping zone)
2 inlet for concentrated draw solution
3 outlet for dilute draw solution
4 feed chamber (evaporation zone)
5 inlet for feed solution
6 outlet for concentrated feed solution
7 vapor chamber (diffusion zone)
8 dam (for drainage)
9 first membrane for contact with draw solution
10 second membrane for contact with feed solution
11, 11a outlet for any draw solution passing through the membrane 9
12, 12a outlet for any feed solution passing through the membrane 10
13 vacuum line
14, 14a heat exchanger
15, 15a total OVD module according to the invention 16, 16a polypropylene separating film in the heat exchanger 14, 14a

EXAMPLES

Example 1

A focus of the invention is the use of a novel arrangement for separation of materials, namely osmotic vacuum distillation (OVD module), for preventing mixing of liquids in the case of membrane wetting. The concept of the module arrangement is shown in FIG. 1. This novel arrangement makes it possible to separate the liquids (feed solution and draw solution) by means of two hydrophobic membranes 9 and 10 between which a vapor channel 7, which also serves to discharge any liquids which have intruded, is arranged.

At the start of the process, the system pressure is reduced to a pressure of 20 mbar (20 hPa) using a vacuum pump via the conduit 13. Mass transfer can be significantly improved thereby, since the transport of water vapor can be hindered by the membrane pores and, in the vapor chamber 7, by any inert gasses. Feed solution (NaCl 10% by weight, temperature 50° C., water vapor partial pressure 110 mbar) is admitted via the inlet 5 into the feed chamber 4. Water vapor is conveyed through the membrane 10 having the active area of 0.5 m$^2$ into the vapor chamber 7 (diffusion zone). The vapor flux through the membrane 10 is 3 kg/h·m$^2$. The concentrated feed solution (NaCl 10.1% by weight, temperature 41° C., water vapor partial pressure 70 mbar) leaves the feed chamber 4 via the outlet 6. The concentrated draw solution (NaOH 30% by weight, temperature 50° C., water vapor partial pressure 64 mbar) entering at the inlet 2 takes up water vapor which goes through the membrane 9 into the draw solution chamber 1 (stripping zone). The vapor flux through the membrane 9 is likewise 3 kg/h·m$^2$. The diluted draw solution (NaOH 29.6% by weight, temperature 60° C., water vapor partial pressure 100 mbar) leaves the draw solution chamber 1 via the outlet 3. A dam 8 in the vapor channel 7 additionally ensures that mixing of any feed solution and any draw solution which have gone through the membranes 9 and 10, respectively, is not possible. These are separately discharged via the lines 11 and 12 and optionally recirculated.

A further advantage of the present arrangement is that two membranes 9 and 10 having different properties can be used, depending on the requirements which feed solution and draw solution have to meet. A membrane 9 having the following properties can advantageously be used:
   active layer: PTFE, layer thickness about 25 μm, pore size 0.2 μm, water intrusion pressure 3.5 bar;
   support layer: PP, layer thickness about 200 μm.

The latent heat of the water vapor cools the feed solution 6 as a result of evaporation and heats the draw solution 3 as a result of the condensation. However, this heat transport reduces the driving vapor pressure difference for mass transfer.

Example 2

FIG. 2 depicts, by way of example, an arrangement having two coupled modules 15, 15a which are employed for a concentrated draw solution at 50° C. and a dilute feed solution at 50° C. The arrangement consists of two membrane modules 15, 15a and two heat exchangers 14, 14a. The heat exchangers 14, 14a are configured as frame-like inserts which have inlets and outlets for the liquids (feed solution and draw solution) and are closed at the side by the modules 15, 15a or by an end plate. Thin (about 25 μm) polypropylene films 16 and 16a, which serve as heat transfer area, are applied to each of the frames of the heat exchangers 14, 14a (FIG. 2). The heat exchangers 14, 14a formed in this way are assembled alternately with the OVD membrane modules 15, 15a to form a block. The innovative concept of realizing all functions in one block offers advantages in respect of avoidance of additional external heat exchangers and piping. In the heat exchangers 14, 14a, heat exchange between the respective depleted draw solution and enriched feed solution occurs (heat recovery).

The two solutions, draw solution 2 and feed solution 5, are conveyed in countercurrent. The system pressure is reduced to 20 mbar at the beginning of the process. The draw solution (NaOH, 30.00% by weight, temperature 50° C., 100 kg/h) enters the OVD module 15 via the inlet 2. The feed solution (NaCl, 9.85% by weight, temperature 50° C., 101.5 kg/h) enters a heat exchanger 14a via the inlet 5. The draw solution leaves module 15 and, after passing through heat exchanger 14, is introduced into the draw chamber of module 15a. Further depleted draw solution leaving module 15a is, after passing through the further heat exchanger 14a, discharged (conduit 3). In order to achieve optimal mass transfer between feed solution and draw solution, a plurality of the two-module arrangements described in this example 2 are connected in series, with the number of two-module arrangements used being in the order of 20 in the case of an increase in the concentration of the feed solution of 100 kg/h from 7% by weight to 20% by weight. The parameters relevant to the process can be seen in tables 1 and 2.

TABLE 1

Parameters for membrane modules

|  | Module 15 | | Module 15a | |
| --- | --- | --- | --- | --- |
|  | NaOH | NaCl | NaOH | NaCl |
| Flux [kg/hm$^2$] | 3 | 3 | 3 | 3 |
| membrane area [m$^2$] | 0.5 | 0.5 | 0.5 | 0.5 |
| Tin [° C.] | 50.0 | 56.0 | 53.0 | 58.5 |
| Tout [° C.] | 59.9 | 47.4 | 62.5 | 50.0 |
| Mass flow_in [kg/h] | 100.0 | 100.0 | 101.5 | 101.5 |
| Mass flow_out [kg/h] | 101.5 | 98.5 | 103.0 | 100.0 |
| Concentration_in [% by weight] | 30.00 | 10.00 | 29.56 | 9.85 |
| Concentration_out [% by weight] | 29.56 | 10.15 | 29.13 | 10.00 |
| Vapor pressure_in [mbar] | 63 | 140 | 68 | 165 |
| Vapor pressure_out [mbar] | 100 | 95 | 120 | 108 |
| Cp [J/kgK] | 3590 | 4180 | 3590 | 4180 |

TABLE 2

Parameters for heat exchangers

|  | Heat exchanger 14 | | Heat exchanger 14a | |
| --- | --- | --- | --- | --- |
|  | NaOH | NaCl | NaOH | NaCl |
| Area [m$^2$] | 0.25 | | 0.4 | |
| k [W/m$^2$K] | 800 | | 800 | |
| Tin [° C.] | 59.9 | 50.0 | 62.6 | 50.0 |
| Tout [° C.] | 53.0 | 56.0 | 52.6 | 58.5 |

Example 3

The modular construction is very flexible and can easily be changed by altering the order of heat exchanger blocks and membrane blocks. FIG. 3 shows, by way of example, a modification of the arrangement of example 2, which is designed for a hot concentrated draw solution (NaOH, 30% by weight, temperature 70° C., 100 kg/h) and a dilute cold feed solution (NaCl, 9.85% by weight, temperature 40° C., 101.5 kg/h). In this case, the two solutions 2 and 5 are firstly fed into a heat exchanger 14 located upstream of the first module 15 in order to effect heat exchange. The feed solution which has been heated to 60° C. flows into the module 15*a*. The NaOH which has been cooled to 50° C. flows into the module 15. The two solutions are then conveyed in a manner analogous to example 2 in countercurrent through the modules 15, 15*a* and the heat exchanger 14.

The invention claimed is:

1. An osmotic distillation process for concentrating an aqueous liquid containing sodium chloride, where the liquid has a concentration of up to 20% by weight of sodium chloride, which comprises at least the following steps,
   a) optionally prepurification of the liquid to remove organic secondary constituents, optionally down to a total content of the organic secondary constituents of 20 ppm,
   b) introducing the optionally prepurified liquid into a first evaporation zone which is separated from a diffusion zone adjoining the first zone by a hydrophobic first membrane which is permeable to water vapor,
   c) diffusion of water vapor from the liquid containing sodium chloride through the membrane into the diffusion zone,
   d) further diffusion of water vapor from the diffusion zone through a second hydrophobic membrane which is permeable to water vapor into a stripping zone adjoining the diffusion zone and absorption of the water vapor in a draw solution which is continuously replaced in the stripping zone.

2. The process as claimed in claim 1, wherein a concentrated alkaline metal hydroxide solution, having a concentration of alkaline metal hydroxide, of from 10% by weight to 50% by weight, is used as the draw solution.

3. The process as claimed in claim 1, wherein the aqueous liquid containing sodium chloride is production wastewater from a process for preparing polymers.

4. The process as claimed in claim 1, wherein the first membrane and the second membrane are, independently of one another, comprised of a hydrophobic polymer.

5. The process as claimed in claim 1, wherein the evaporation zone, diffusion zone, and stripping zone are maintained independently of one another at atmospheric pressure or reduced pressure.

6. The process as claimed in claim 1, wherein the evaporation zone, diffusion zone, and stripping zone are, independently of one another, maintained at a temperature of from 10 to 80° C.

7. The process as claimed in claim 6, wherein the temperature in the evaporation zone is greater than in the diffusion zone and the stripping zone.

8. The process as claimed in claim 1, wherein the liquid containing sodium chloride in the evaporation zone and the draw solution in the stripping zone are conveyed in countercurrent relative to one another past the respective membranes.

9. The process as claimed in claim 1, wherein the aqueous liquid containing sodium chloride has turbulent flow in the evaporation zone.

10. The process as claimed in claim 1, wherein the evaporation zone, diffusion zone, and stripping zone have been joined to one another by means of fusion bonding.

11. The process as claimed in claim 1, wherein the process steps b), c) and d) are carried out in a plurality of stages, with at least one further evaporation zone, diffusion zone, and stripping zone being employed.

12. The process as claimed in claim 1, wherein liquid exits from the first evaporation zone in a first arrangement made up of evaporation zone, diffusion zone, and stripping zone and is again subjected to process steps b) and c) in at least one downstream arrangement made up of evaporation zone, diffusion zone, and stripping zone and diluted draw solution exits from a second stripping zone in at least one downstream arrangement made up of evaporation zone, diffusion zone, and stripping zone is used for carrying out step d) in the first arrangement made up of evaporation zone, diffusion zone, and stripping zone.

13. The process as claimed in claim 12, wherein a concentrated aqueous liquid containing sodium chloride exits from the evaporation zone of the first osmotic distillation arrangement and is subjected to heat exchange.

14. The process as claimed in claim 12, wherein a draw solution exits from the stripping zone of the first arrangement and is subjected to heat exchange.

* * * * *